Patented Aug. 7, 1923.

1,463,864

UNITED STATES PATENT OFFICE.

LEAVITT N. BENT, OF HOLLY OAK, DELAWARE, ASSIGNOR TO HERCULES POWDER COMPANY, OF WILMINGTON, DELAWARE, A CORPORATION OF DELAWARE.

PROCESS OF MAKING STORAGE-BATTERY ELEMENTS.

No Drawing. Application filed May 24, 1922. Serial No. 563,427.

*To all whom it may concern:*

Be it known that I, LEAVITT N. BENT, a citizen of the United States, residing at Holly Oak, county of New Castle, and State of Delaware, have invented a new and useful Improvement in Processes of Making Storage-Battery Elements, of which the following is a full, clear, and exact description, reference being had to the accompanying drawings, which form a part of this specification.

Storage battery separators, positioned between the active plates, should have certain qualities which are difficult to combine. Besides performing their necessary function of allowing passage of electrolyte and preventing passage of solid material, they should be durable and they should be of small weight and bulk and produce a battery with low internal resistance. Plates, membranes or diaphragms of celluloid, perforated by mechanical, as distinguished from chemical or physical, means, have been used; but in none of the qualities above mentioned do they excel. They occasion a comparatively high internal battery resistance. Although, in forming the perforations, the material of the plate at the peripheries of the perforations is upset in such a way as to obstruct the plugging up of the holes with solid particles, they do not by any means wholly prevent such action, whereby the efficiency of the battery is further diminished.

The object of my invention is to provide a separator that will have all the advantages of a perforated celluloid plate, but that will have none of the defects of such a plate. That is, I aim to secure low internal battery resistance and also maximum thinness and lightness, prevent the clogging of the plate by deposition of solid particles, and provide a plate that will be less destructible and whose efficiency will not so quickly diminish with use.

The essential characteristics of the invention, in its broad and narrow aspects, with respect both to the novel product and the novel process of making it, are defined in the appended claims. Preliminary thereto I shall first describe my preferred method of making my preferred product, and I shall then point out illustrative permissible deviations both in respect to the product and process.

My preferred process embraces steps which may be identical with those involved in the manufacture of celluloid separators and those steps need not be recited in detail, they being familiar to those skilled in the art. Deviation therefrom, or additions thereto, will be described with more particularity, so that any one skilled in the art may secure the desired product without the necessity of experimental work.

To nitrocellulose I add a suitable latent solvent, for instance camphor, and a suitable active solvent, for instance alcohol, using the proportions, and proceeding in the manner, known in the manufacture of celluloid. At the same time I add a salt that is soluble in some liquid that is not a solvent of celluloid, and that will not attack the battery plates or combine with sulfuric acid or be otherwise detrimental to the battery. A desirable salt of this character is sodium sulfate. It possesses the advantages of being economical, of being soluble in the cheapest of solvents—water—and of being without injurious effect upon the battery. The salt need be of no fixed granulation, but I prefer it to be fine enough to pass through a 50 or 60 mesh screen. The amount of the salt that it is desirable to add will vary with the degree of porosity that it is desired to impart to the separator, and may possibly be affected by other factors, but I have secured satisfactory results by adding an amount about equal in weight to the nitrocellulose and its latent solvent or solvents, so that, after its addition, it constitutes about fifty per cent of the total dry weight of the product.

The process then proceeds as in the manufacture of celluloid. The ingredients are mixed into a plastic mass, and after part of the alcohol or other active solvent is evaporated off, the mass is then pressed if necessary and then run through a sheeting press to form slabs, from which sheets are cut of any desired thickness. After the sheets are cut, they are air-dried.

The sheets are then immersed or suspended in a tank of flowing warm water, which acts to dissolve out the salt, producing a plate, membrane or diaphragm, that is porous, and the weight of which has been reduced in proportion to the amount of salt removed. Subsequent treatment of the sheet, such as is required to straighten or form it, should not diminish the porosity. Being (at least preferably) devoid of mechanical perforations, it may be made much thinner and lighter than is usually the case with most types of separators. It is almost indestructible. It produces a low internal battery resistance. It is freely penetrable by the electrolyte, but is practically impenetrable by solid particles.

It is difficult to completely dissolve out all the salt, but the proportion that remains has no effect except to reduce the porosity. In view of the fact, however, that the residual salt will hardly exceed two or three per cent, the reduction thereby of the porosity of the separator will be merely nominal. Even a smaller proportion, however, would have a destructive effect upon the battery if it were to chemically react with the lead oxid or any other element thereof; wherefore certain salts are not adapted for use. However, there are many salts that are substitutable for sodium sulfate. Potassium sulfate and ammonium sulfate are examples. Carbonates, including sodium carbonate, potassium carbonate, ammonium carbonate and calcium carbonate, may be used. All of the above salts except the last are soluble in water. If calcium carbonate be used, it may be dissolved out with acetic acid, or hydrochloric acid.

Still another class of salts may be used, namely: those compounds, such as ammonium carbonate, which are volatile and which may be removed by heating and without the use of solvents.

Less desirably, I have also found it possible to use certain materials, as additions to the celluloid ingredients, which are not salts, but which may be subsequently eliminated by a suitable solvent and leave the celluloid separators in a porus condition. A substance of this character is sulfur, which may be dissolved out by means of carbon bisulfide.

It will, of course, be understood that whatever substance is added to the original celluloid ingredients, its removal can ordinarily be effected only by a liquid that is a solvent of such substance and is not a solvent of celluloid, or by heat as above described. Among such solvents may be mentioned carbon tetrachloride, certain alcohols, certain acids and organic solvents.

Also, I have found it possible to add to the celluloid ingredients certain materials which themselves are of a distinctly porous character and which do not need to be dissolved, washed out or otherwise removed. Purified wood pulp is a good and practicable example of this class of substances.

In the finished product the celluloid acts as a binder for the wood pulp and as much wood pulp is therefore added as will not destroy or impair the cohesiveness, elasticity and strength of the separator. In place of wood pulp, I may use cotton fibre, cotton lint, charcoal, cotton fly, cork dust, kieselguhr, or some other material that possesses inherent porosity.

No substance should be added, however, whether it is intended to be removed or is intended to be retained, that will react with detrimental effect with celluloid, or which, if retained in any appreciable proportion, will react with detrimental effect with sulfuric acid, lead oxid or any other element of the battery.

In place of camphor as a latent solvent for the nitrocellulose, I may use any camphor substitute, that is, any substance that will colloid nitrocellulose into a pyroxylin plastic, such as triphenyl phosphate, tricresyl phosphate, etc. I may also employ any known active solvents of nitrocellulose in place of alcohol. These solvents (for example, acetone and the acetates) are well known.

Nitrocellulose itself may be replaced by cellulose acetate, from which will be made a cellulose acetate plastic instead of a pyroxylin plastic. In specifying nitrocellulose in the claims, I mean to include equivalents thereof, such as cellulose acetate; and in specifying celluloid, I mean to include as equivalents known celluloid substitutes.

While my invention is more specifically intended and adapted for application to the manufacture of separator plates for storage batteries, it is available for use in the manufacture of other storage battery elements. For example, it is known to manufacture the positive plates of a series of perforated tubes, made of lead or rubber and filled with lead oxid. It is distinctly advantageous to utilize my porous celluloid as a substitute for the material of these tubes.

Where in any claims I specify a porous celluloid, I mean to include a celluloid the pores whereof are either filled with a material, such as wood pulp, that is itself porous, or are spaces from which a widely disseminated material, such as a water-soluble salt, have been largely or wholly removed.

I have not herein claimed the article described as the same forms the subject of an application filed by me July 31, 1922, Serial No. 578,834, as a division hereof.

Having now fully described my invention, what I claim and desire to protect by Letters Patent is:

1. The process of making storage battery elements which comprises mixing nitrocellulose, a latent solvent thereof and an active solvent thereof, with an ingredient that will not injuriously react with celluloid or with an element of the battery and which is adapted, in the subsequent manufacture into celluloid, to be intimately distributed throughout the mass of celluloid so as to impart porosity to the same.

2. The process of making storage battery elements which comprises mixing nitrocellulose, a latent solvent thereof and an active solvent thereof, with an ingredient that will not injuriously react with celluloid or with an element of the battery and which is adapted, in the subsequent manufacture into celluloid, to be intimately distributed throughout the mass of celluloid and, after said ingredient is so distributed, eliminating a substantial proportion thereof so as to leave the pores open.

3. The process of making storage battery elements which comprises mixing nitrocellulose, a latent solvent of nitrocellulose, an active solvent of nitrocellulose and an ingredient that will not injuriously react with celluloid or with an element of the battery and which is soluble in a liquid that will not injuriously react with celluloid, treating the mixture to form a celluloid-like product, and dissolving out a substantial proportion of said ingredient in a solvent thereof that is not a solvent of celluloid.

4. The process of making storage battery elements which comprises mixing nitrocellulose, a latent solvent thereof and an active solvent thereof, with a water soluble salt that will not injuriously react with an element of the battery, treating the mixture to form a celluloid-like product, and washing the product with water until a substantial proportion of the salt is eliminated.

5. The process of making storage battery separators which comprises mixing nitrocellulose, a latent solvent thereof and an active solvent thereof, with an ingredient that will not injuriously react with celluloid or with an element of the battery and which is adapted to be intimately distributed throughout the mass as to impart porosity to the subsequently produced celluloid, and subjecting the mixture to a succession of treatments to ultimately produce thin sheets.

6. The process of making storage battery separators which comprises mixing nitrocellulose, a latent solvent thereof and an active solvent thereof, with an ingredient that will not injuriously react with celluloid or with an element of the battery and which is adapted to be intimately distributed throughout the mass as to impart porosity to the subsequently produced celluloid, subjecting the mixture to a succession of treatments to ultimately produce thin sheets, and eliminating a substantial proportion of said ingredient so as to provide sheets with open pores.

7. The process of making storage battery separators which comprises mixing nitrocellulose with a latent solvent thereof, an active solvent thereof and an ingredient that will not injuriously react with celluloid or with any element of the battery and which is soluble in a liquid that will not injuriously react with celluloid, subjecting the mixture to a succession of treatments to ultimately produce thin sheets composed of celluloid, throughout which said ingredient is widely distributed, and dissolving out a substantial proportion of said ingredient in a solvent thereof that is not a solvent of celluloid.

8. The process of making storage battery separators which comprises mixing nitrocellulose with a latent solvent thereof, an active solvent thereof and a water soluble salt that will not injuriously react with an element of the battery, subjecting the mixture to a succession of treatments to ultimately produce thin sheets of porous celuloid throughout the pores of which the salt is distributed, and dissolving a substantial proportion of the salt out of said pores with water.

In testimony of which invention, I have hereunto set my hand, at Wilmington, on this 16th day of May, 1922.

LEAVITT N. BENT.